US012796711B2

(12) United States Patent
Doelman

(10) Patent No.: US 12,796,711 B2
(45) **Date of Patent: *Nov. 17, 2026**

(54) METHODS TO INCREASE MILK YIELD AND YIELD OF MILK CONSTITUENTS IN LACTATING RUMINANTS

(71) Applicant: Nutreco IP Assets B.V., Boxmeer (NL)

(72) Inventor: John Henry Doelman, Boxmeer (NL)

(73) Assignee: Nutreco IP Assets B.V., Boxmeer (NL)

( * ) Notice: Subject to any disclaimer, the term of this patent is extended or adjusted under 35 U.S.C. 154(b) by 826 days.

This patent is subject to a terminal disclaimer.

(21) Appl. No.: 17/149,547

(22) Filed: Jan. 14, 2021

(65) Prior Publication Data

US 2021/0137138 A1 May 13, 2021

Related U.S. Application Data

(63) Continuation of application No. PCT/EP2019/069194, filed on Jul. 17, 2019.

(30) Foreign Application Priority Data

Jul. 17, 2018 (EP) .................................... 18183868

(51) Int. Cl.
*A23K 20/105* (2016.01)
*A23K 20/158* (2016.01)
*A23K 50/10* (2016.01)

(52) U.S. Cl.
CPC .......... *A23K 20/105* (2016.05); *A23K 20/158* (2016.05); *A23K 50/10* (2016.05)

(58) Field of Classification Search
None
See application file for complete search history.

(56) References Cited

U.S. PATENT DOCUMENTS

| | | | |
|---|---|---|---|
| 3,458,625 | A | 7/1969 | Ensor et al. |
| 3,541,204 | A | 11/1970 | Sibbald |
| 3,959,493 | A | 5/1976 | Baalsrud et al. |
| 4,227,166 | A | 10/1980 | Tsuji et al. |
| 4,713,245 | A | 12/1987 | Ando et al. |
| 4,808,412 | A | 2/1989 | Smith et al. |
| 4,832,967 | A | 5/1989 | Autant et al. |
| 4,876,097 | A | 10/1989 | Autant et al. |
| 5,496,571 | A | 3/1996 | Blagdon et al. |
| 6,718,910 | B1 | 4/2004 | Koyama et al. |
| 7,550,172 | B2 | 6/2009 | Weakley et al. |
| 2004/0156855 | A1 | 8/2004 | Koyama et al. |
| 2013/0064884 | A1 | 3/2013 | Rohrer et al. |
| 2013/0196023 | A1 | 8/2013 | Holma |
| 2013/0344167 | A1 | 12/2013 | Chery et al. |
| 2018/0228182 | A1 | 8/2018 | Doelman |

FOREIGN PATENT DOCUMENTS

| | | | | |
|---|---|---|---|---|
| CN | 1689431 A | 11/2005 | | |
| CN | 106578445 A | 4/2017 | | |
| CN | 107205437 A | 9/2017 | | |
| EP | 0 479 555 A2 | 4/1992 | | |
| EP | 1 230 922 A1 | 8/2002 | | |
| EP | 2 274 990 A1 | 1/2011 | | |
| FR | 2880518 A3 | 7/2006 | | |
| JP | S61-195653 A | 8/1986 | | |
| JP | S62-029996 A | 2/1987 | | |
| JP | S63-317053 A | 12/1988 | | |
| JP | 2014-503505 A | 2/2014 | | |
| WO | WO-96/08168 A1 | 3/1996 | | |
| WO | WO-01/28551 A1 | 4/2001 | | |
| WO | WO-2006/085774 A1 | 8/2006 | | |
| WO | WO-2007/048369 A1 | 5/2007 | | |
| WO | WO-2010/108483 A1 | 9/2010 | | |
| WO | WO-2010/151620 A2 | 12/2010 | | |
| WO | WO-2011/014069 A2 | 2/2011 | | |
| WO | WO-2013/133713 A1 | 9/2013 | | |
| WO | WO-2015/016819 A1 | 2/2015 | | |
| WO | WO-2016055651 A1 | * | 4/2016 | ........... A23K 20/105 |
| WO | WO-2016/126683 A1 | 8/2016 | | |
| WO | WO-2020/016271 A1 | 1/2020 | | |

OTHER PUBLICATIONS

Milk Production (downloaded on Dec. 19, 2024). (Year: 2024).*
Database WPI, Week 201734, Thomson Scientific, London, GB; AN 2017-28555B, XP002784068,& CN 106 578 445 A (Anhui Muyang Animal Husbandry Co Ltd) Apr. 26, 2017 (Apr. 26, 2017).
International Search Report and Written Opinion of the International Searching Authority in PCT/EP2019/069194 mailed Oct. 9, 2019, 11 pages.
R. S. Emery et al: "Effect of a Modified 1-17 Sulfite Waste Liquor and of Calcium Gluconate on Milk Production", Journal of Dairy Science., vol. 43, No. 11,Nov. 1, 1960 (Nov. 1, 1960), pp. 1643-1647.
Search Report mailed Sep. 7, 2018 in corresponding European priority Application No. 18183868.1, 9 pages.
Bradford et al., "Invited review: Inflammation during the transition to lactation: New adventures with an old flame", Kansas State University, Jun. 2015, vol. 98, No. 10, pp. 6631-6650.
Cao et al., "Application of Propionate in Ruminants", Chinese Animal Husbandry and Veterinary Medicine, 2017, vol. 44, No. 12, pp. 3519-3524.
D'Silva et al., "Localization of phytase in Selenomonas ruminantium and Mitsuokella multiacidus by transmission electron microscopy," Canadian Journal of Microbiology, Apr. 2000, vol. 46, No. 4.
Database WPI Week Mar. 2, 2001 Thomson Scientific, London, GB; AN 2001-308372 Koyama et al., "Agent for promoting fattening of animals, increasing the growth of digestive bacteria, and inhibiting the formation of harmful waste products, comprises acids derived from hexose compound products," Apr. 26, 2001.

(Continued)

*Primary Examiner* — Jake M Vu
(74) *Attorney, Agent, or Firm* — Sunit Talapatra; Foley & Lardner LLP

(57) ABSTRACT

The present invention is in the field of animal feed, feed supplements, premixes, and feed additives, more particular for ruminants, even more particular for improvement of performance, in particular lactation performance, of a ruminant animal. Provided are methods to increase milk yield, milk protein yield, milk fat yield, milk lactose yield and energy-corrected milk yield in a lactating ruminant.

20 Claims, No Drawings

(56) References Cited

OTHER PUBLICATIONS

Farm Health Online—Animal Health and Welfare Knowledge Hub—Ketosis, "Cattle Diseases", Ketosis, Farm Health Online, 2018, pp. 1-7 (Year: 2018).
International Preliminary Report on Patentability on PCT Appl. Ser. No PCT/EP2015/073479 dated Apr. 20, 2017 (9 pages).
International Preliminary Report on Patentability on PCT Appl. Ser. No. PCT/EP2019/069195 dated Jan. 19, 2021 (10 pages).
International Search Report and Written Opinion on PCT Appl. Ser. No. PCT/EP2015/073479 dated Jan. 12, 2016 (11 pages).
International Search Report and Written Opinion on PCT Appl. Ser. No. PCT/EP2019/069194 dated Sep. 10, 2019 (11 pages).
International Search Report and Written Opinion on PCT Appl. Ser. No. PCT/EP2019/069195 dated Sep. 11, 2019 (13 pages).
Jayaprakash et al., "Rumen protected choline: A significance effect on dairy cattle nutrition", Veterinary World, 2016, vol. 9, No. 8, pp. 837-841.
Mandebvu et al., "Effect of feeding an energy supplement prepartum and postpartum on milk yield and composition, and incidence of ketosis in dairy cows", Animal Feed Science and Technology, Dec 2002, vol. 105, pp. 81-93.
Ouwerkerk et al., "Enumeration of Megasphaera elsdenii in rumen contents by real-time Taq nuclease assay," Journal of Applied Microbiology, 2002, vol. 92, pp. 753-758.
Weiss et al., "Effect of Feeding Propionibacteria on Milk Production by Early Lactation Dairy Cows", Journal of Dairy Science, American Dairy Science Association, US, Feb. 1, 2008, vol. 91, No. 2, pp. 646-652.
Doelman et al., "Postruminal infusion of calcium gluconate increases milk fat production and alters fecal volatile fatty acid profile in lactating dairy cows" J. Dairy Sci., 2019, vol. 102, No. 2, pp. 1274-1280, retrieved from: https://doi.org/10.3168/jds.2018-15148.
McKnight et al., "Feeding and postruminal infusion of calcium gluconate to lactating dairy cows" Can. J. Anim. Sci., Mar. 12, 2019, vol. 99, pp. 563-569.

* cited by examiner

METHODS TO INCREASE MILK YIELD AND YIELD OF MILK CONSTITUENTS IN LACTATING RUMINANTS

CROSS-REFERENCE TO RELATED APPLICATIONS

This application is a continuation of International Application No. PCT/EP2019/069194, filed Jul. 17, 2019, which claims the benefit of and priority to European Application No. 18183868.1, filed Jul. 17, 2018, both of which are hereby incorporated by reference herein in their entireties.

FIELD OF THE INVENTION

The present invention is in the field of animal feed, feed supplements, premixes, and feed additives, more particular for ruminants, even more particular for improvement of performance, in particular lactation performance, of a ruminant animal.

Provided are methods to increase milk yield, milk protein yield, milk fat yield, milk lactose yield and energy-corrected milk yield in a lactating ruminant.

Particularly advantageous is application during late gestation and early lactation in dairy cows, in particular during the so-called transition period.

BACKGROUND OF THE INVENTION

Ruminant-derived products, such as dairy products, make up a large portion of the Westernized diet and demand for these products is increasing. Substantial research efforts have been put towards the development of feeds and feed supplements for lactating (dairy) ruminants, which lead to improved quality and/or quantity of ruminant-derived products and cost-effective farming practices.

One area of interest in this respect is the milk industry. Dairy farmers and the dairy industry assess the value of milk by total yield and the yield of milk constituents like fat, lactose and protein, as well as energy-corrected milk yield.

Emery et al., J. Dairy Sci. Vol. 43:1643-1647 (1960) administered calcium gluconate to low yielding lactating dairy cows. The authors observed a modest effect on milk yield upon administration of high amounts of calcium gluconate.

WO2016/055651A1 describes a rumen bypass gluconic acid composition that, when administered from 21 d postpartum, enhanced milk fat yield in lactating dairy cows and corresponding fat-corrected milk yield.

It is an object of the present invention to provide a feed, feed supplement, premix or feed additive for ruminants, particularly adult ruminants, more particular pregnant or lactating ruminants, and methods of using such feed, feed supplement, premix or feed additive, that allow for an increased milk yield, milk protein yield, milk fat yield, milk lactose yield and energy-corrected milk yield, and even more preferably to increase both the milk yield and the yield of milk constituents like milk fat, milk lactose, and milk protein.

SUMMARY OF THE INVENTION

It was surprisingly found that when the composition taught in WO2016/055651 was fed starting prepartum, particularly in the dry period, more particularly as of 21 days pre-partum, even more particularly during the transition period of a dairy cow and beyond, not only milk fat yield was increased, but also milk yield, milk lactose yield, milk protein yield and energy-corrected milk yield were increased throughout the lactation period, compared to a control that was not fed a composition comprising gluconic acid and/or one or more derivatives thereof, with no change in feed intake. Surprisingly, relatively low amounts of the gluconate composition taught herein were required to achieve these effects.

In a first aspect, the present invention relates to the use of a composition comprising a gluconic acid and/or one or more derivatives thereof and a controlled release agent for increasing milk yield in a lactating ruminant, wherein the rumen-bypass composition is administered at least in the transition period, preferably at least between about 21 days prepartum and about 21 days postpartum.

In a further aspect, the present invention relates to the use of a composition comprising a gluconic acid and/or one or more derivatives thereof and a controlled release agent for increasing protein yield in milk in a lactating ruminant, wherein the composition is administered at least in the transition period, preferably at least between about 21 days prepartum and about 21 days postpartum.

In another aspect, the present invention relates to the use of a composition comprising a gluconic acid and/or one or more derivatives thereof and a controlled release agent for increasing milk fat yield in a lactating ruminant, wherein the composition is administered at least in the transition period, preferably at least between about 21 days prepartum and about 21 days postpartum.

In another aspect, the present invention relates to the use of a composition comprising a gluconic acid and/or one or more derivatives thereof and a controlled release agent for increasing lactose yield in milk in a lactating ruminant, wherein the composition is administered at least in the transition period, preferably at least between about 21 days prepartum and about 21 days postpartum.

In another aspect, the present invention relates to the use of a composition comprising a gluconic acid and/or one or more derivatives thereof and a controlled release agent for increasing energy-corrected milk yield in a lactating ruminant, wherein the composition is administered at least in the transition period, preferably at least between about 21 days prepartum and about 21 days postpartum.

The one or more gluconic acid derivatives may be selected from gluconate salts or gluconate esters. In an embodiment, the one or more gluconate salts may be selected from calcium gluconate, sodium gluconate, quinine gluconate, ferrous gluconate, potassium gluconate, zinc gluconate, copper gluconate, cobalt gluconate, barium gluconate, lithium gluconate, magnesium gluconate and cupric gluconate, preferably is calcium gluconate and/or sodium gluconate, more preferably is calcium gluconate.

The controlled release agent may be selected from the group consisting of fatty acids, animal oils, vegetable oils and mixtures thereof. The controlled release agent may be a vegetable oil. The vegetable oil may be selected from palm oil, soybean oil, rapeseed oil, cottonseed oil, castor oil, and mixtures thereof.

In an embodiment, the vegetable oil is palm oil.

The vegetable oil may be partly hydrogenated, preferably fully hydrogenated.

In an embodiment, the weight percent ratio of the gluconic acid and/or one or more derivatives thereof to the controlled release agent may range from about 20:80 to about 65:35 percent by weight, or may be at least about 40:60 percent by weight, preferably 50:50 percent by weight.

The ruminant may be selected from the group consisting of cows, cattle, sheep, goats, bison, buffalo, moose, elks, giraffes, yaks, deer, camels, antelope, preferably cows.

The composition may be administered orally.

In an embodiment, the composition may be administered during the dry period of the lactating ruminant.

In an embodiment, the composition may be administered during the lactation phase of the lactating ruminant.

GENERAL DEFINITIONS

In the following description and examples, a number of terms are used. In order to provide a clear and consistent understanding of the specification and claims, including the scope to be given to such terms, the following definitions are provided. Unless otherwise defined herein, all technical and scientific terms used have the same meaning as commonly understood by one of ordinary skill in the art to which this invention belongs. The disclosures of all publications, patent applications, patents and other references are incorporated herein in their entirety by reference.

The term 'gluconic acid' as used herein refers to an organic compound with molecular formula $C_6H_{12}O_7$ and condensed structural formula $HOCH_2(CHOH)_4COOH$. It is one of the 16 stereoisomers of 2,3,4,5,6-pentahydroxy-hexanoic acid. The term 'gluconic acid derivative(s)' as used herein refers to compound(s) derived from gluconic acid and includes gluconate salts and gluconate esters. The term 'gluconate salts' as used herein refers to any salts derived from gluconic acid. The salts of gluconic acids are also known as "gluconates". Non-limiting examples of gluconate salts include calcium gluconate, sodium gluconate, ferrous gluconate, potassium gluconate, zinc gluconate, copper gluconate, cobalt gluconate, barium gluconate, lithium gluconate, magnesium gluconate, manganese gluconate, cupric gluconate and the like. Non-limiting examples of gluconate esters include gluconic acid cyclic ester with boric acid, quinine gluconate, glucono-delta-lactone, and the like.

The term 'ruminants' or 'ruminant animals' as used herein refers to mammals that are able to acquire nutrients from plant-based food through fermentation in a specialized stomach chamber prior to digestion, principally through microbial actions. The process typically requires regurgitation of fermented ingesta (known as cud), and chewing it again. The process of rechewing the cud to further break down plant matter and stimulate digestion is called "rumination". The primary difference between ruminant animals and non-ruminant animals is that ruminant animals have a four-chambered stomach.

In the rumen most of the fermentation of feed material takes place. The rumen is populated by several phyla of microorganisms, which result in fermentation of feedstuffs. In the reticulum similar fermentation functions are carried out. The rumen and reticulum are often refer to as the 'reticulorumen', which essentially consists of a "fermentation chamber" containing micro-organisms which convert complex plant carbohydrate to volatile fatty acids (mainly acetate, propionate and butyrate), lactate, carbon dioxide, methane and hydrogen. The omasum serves as a gateway for the abomasum allowing absorption of volatile fatty acids and water to reduce the volume of digesta reaching the abomasum. The abomasum is often referred to as the direct equivalent of the monogastric stomach, and is often called the 'true stomach' due to its ability to digest and degrade feed materials in an acidic and enzymatic environment. Material digested in the abomasum (also called digesta) transits into the small intestine, where the further digestion and absorption of nutrients occurs.

Non-limiting examples of ruminants include bovine animals such as dairy cattle, beef cattle, sheep, goats, buffalo, moose, elks, bison, giraffes, yak, deer, camels, antelopes, and the like.

The term 'bovine animals' or 'bovine' as used herein refers to a variety of bovine animals including cows, bulls, heifers, steers, stags, does, bucks, oxen, calves, and the like.

The term 'lactating ruminant' as used herein refers to a ruminant animal which is capable of, and preferably intended for, producing milk after parturition.

The term 'dairy ruminant' as used herein refers to a ruminant animal, whose milk is used for commercial purposes.

The term 'ruminal bypass' or 'rumen bypass' refers to a partial or complete 'escape' of digestion or degradation by microorganisms populating the rumen. To bypass the rumen of ruminants one may use a so-called 'controlled release agent' (also often referred to as 'ruminal bypass agent' or 'protective agent'). The term 'controlled release agent' as used herein refers to any compounds, composition, or mixture of compounds or compositions capable of controlling the release of one or more ingredients (e.g., an active compound such as a gluconate salt). The controlled release agent comprised in the composition taught herein preferably allows said active ingredient(s) to partially or substantially bypass the rumen whilst, preferably, allowing said active ingredient(s) to be partially or substantially digested and/or partially or substantially absorbed in the lower intestine of ruminants (i.e. small intestine). In other words, the controlled release agents employed in the compositions taught herein are preferably characterized in that they allow substantial bypass of the rumen and are substantially degraded in the abomasum and/or subsequent regions of the digestive tract, particularly the lower intestine of ruminant animals.

The term 'transition period' refers to a demanding and vulnerable period for the dairy ruminant where metabolic needs increase dramatically and the animal is more sensitive to diseases. The transition typically refers to a period before and after parturition. It may conventionally be described as about 21 days before until about 21 days after parturition. During this period, which is the transition from late gestation to the lactation phase, the animal undergoes metabolic adaptation, mammogenesis, colostrogenesis and lactogenesis to prepare for the lactation period. In practice the duration, the start and/or the end of the transition period can differ from animal to animal. The transition period can start for example about 28 days, about 21 days, about 14 days or about 7 days, or any number of days in between, before parturition and the transition period can end for example about 7 days, about 14 days, about 21 days or about 28 days after parturition. The transition period may be the period between about 28 days before and about 28 days after parturition; or between about 21 days before and about 21 days after parturition; or between about 14 days before and about 14 days after parturition; or between about 7 days before and about 7 days after parturition.

The term 'dry period' refers to the period of time between two lactation phases during the last trimester of gestation. This typically covers the timespan of about 6 to 8 weeks before lactation (prepartum period) until lactation. It is also characterized as the period of non-lactation and mammary gland restructuring prior to parturition and is a preparation phase for the next lactation, necessary for optimal milk production during the next lactation. In practice, often during about the last 21 days of the dry period a transition to the lactation phase will begin. This part of the dry period is the start of the so-called transition phase to lactation and is conventionally described as the 21 days before and after parturition.

The terms 'lactation phase' or 'lactation period' refers to the period of time that the animal secretes milk from the mammary glands. The lactation phase can typically be divided into early-, mid- and late lactation. It follows the 'dry period' at the event of parturition and ends when milk removal is halted at dry off. The dry-off process is when lactogenesis ceases because milk is no longer produced and/or collected from the glands, or the animal is treated with a pharmaceutical agent to stop the lactation process. For a lactating dairy ruminant the lactation period is typically about 305 days (Nutrient Requirements of Dairy Cattle (NRC), 2001). The period can also be longer, for example, 320, 340 or 360 days. In practice, the transition phase from pregnancy and parturition to lactation may be finalized at approximately 21 days postpartum.

The term 'milk yield' as used herein refers to the amount by weight of milk harvested from the lactating dairy ruminant on a daily basis. It is typically quantified in terms of g/day or kg/day.

The term 'milk protein yield' as used herein refers to the amount by weight of milk protein that is harvested from the lactating dairy ruminant on a daily basis. It is typically quantified in terms of g/day or kg/day.

The term 'milk fat yield' as used herein refers to the amount by weight of milk fat that is harvested from the lactating dairy ruminant on a daily basis. It is typically quantified in terms of g/day or kg/day.

The term 'milk lactose yield' as used herein refers to the amount by weight of lactose that is expressed from the mammary glands into milk harvested from the lactating dairy ruminant on a daily basis. It is typically quantified in terms of g/day or kg/day.

The term 'energy-corrected milk yield' as used herein refers to a calculation presented in NRC (2001) which determines milk yield (cMY) corrected for 3.5% fat and 3.2% protein using the following formula: cMY=[(0.3246×kg of milk)+(12.86×kg of fat)+(7.04×kg of true protein)].

The term 'lower intestine' or 'hind gut' as used herein refers to the post-abomasal section of the digestive tract of ruminants and includes the small intestine and its subsections (i.e. duodenum, jejunum, and ileum), as well as the cecum and the large intestine and its subsections (i.e. colon and rectum).

The terms 'to increase' and 'increased level' and the terms 'to decrease' and 'decreased level' refer to the ability to increase or decrease a particular amount. A level in a test sample may be increased or decreased when it is at least 5%, such as 10%, 15%, 20%, 25%, 30%, 35%, 40%, 45%, 50% higher or lower, respectively, than the corresponding level in a control sample or reference sample. Alternatively, a level in a test sample may be increased or decreased when it is statistically significantly increased or decreased. In an embodiment, the control sample or reference sample is from a lactating ruminant, preferably of the same genus and/or species as the test lactating ruminant, not fed with the composition taught herein.

The term 'about', as used herein indicates a range of normal tolerance in the art, for example within 2 standard deviations of the mean. The term "about" can be understood as encompassing values that deviate at most 10%, 9%, 8%, 7%, 6%, 5%, 4%, 3%, 2%, 1%, 0.5%, 0.1%, 0.05%, or 0.01% of the indicated value.

The terms "comprising" or "to comprise" and their conjugations, as used herein, refer to a situation wherein said terms are used in their non-limiting sense to mean that items following the word are included, but items not specifically mentioned are not excluded. It also encompasses the more limiting verb "to consist essentially of" and "to consist of".

Reference to an element by the indefinite article "a" or "an" does not exclude the possibility that more than one of the elements is present, unless the context clearly requires that there be one and only one of the elements. The indefinite article "a" or "an" thus usually means "at least one".

DETAILED DESCRIPTION

The present inventors surprisingly found that the release, such as post-ruminal release, of a composition comprising gluconic acid and/or one or more gluconic acid derivatives thereof (e.g. one or more derivatives thereof, such as calcium gluconate) resulted in an increase in milk yield, milk protein yield, milk fat yield, milk lactose yield and energy-corrected milk yield in lactating ruminants, when the composition was administered at the start of the transition period.

In a first aspect, the present invention relates to the use of a composition comprising a gluconic acid and/or one or more derivatives thereof and a controlled release agent for increasing milk yield, milk protein yield, milk fat yield, milk lactose yield and/or energy-corrected milk yield in a lactating ruminant. Preferably, the composition is administered at least in the transition period, e.g., the period between about 21 days prepartum and about 21 days postpartum. In an embodiment the use is non-therapeutic.

The composition may comprise one or more derivatives of gluconic acid, e.g., a gluconate salt or a gluconate ester.

In an embodiment, the composition comprises a gluconate salt, preferably selected from the group consisting of calcium gluconate, sodium gluconate, quinine gluconate, ferrous gluconate, potassium gluconate, zinc gluconate, copper gluconate, cobalt gluconate, barium gluconate, lithium gluconate, magnesium gluconate and cupric gluconate, more preferably calcium gluconate and/or sodium gluconate, more preferably calcium gluconate.

Any controlled release agent that is suitable for allowing at least partial, preferably substantial or substantially complete ruminal bypass may be used in the compositions as taught herein. Partial ruminal bypass, as used herein, may refer to ruminal bypass fractions of over 20%, 25%, or 30%, such as over 35%, 40%, or 45%, preferably as measured using the in vitro rumen simulation method taught herein. Substantial ruminal bypass, as used herein, may refer to ruminal bypass fractions of over 50%, such as over 55%, 60%, 65%, 70%, or 75% or more, preferably as measured using the in vitro rumen simulation method taught herein. Substantially complete ruminal bypass as used herein refers to ruminal bypass fractions of over 80%, 85%, 90%, 95% or more, preferably as measured using the in vitro method taught herein. Controlled release agents that are suitable for allowing partial, substantial, or substantially complete ruminal bypass in ruminants as well as methods to produce and use them for the purpose of partially, substantially, or completely bypassing the rumen are well known and commercially available. The skilled person knows how to prepare an effective controlled release agent that is suitable for allowing partial, substantial, or substantially complete ruminal bypass, and that is suitable for the delivery of gluconic acid and/or more or more gluconic acid derivatives (e.g. calcium gluconate) to the abomasum and lower intestine of ruminants.

In an embodiment, the controlled release agent is additionally suitable for allowing at least partial, preferably substantial, more preferably substantially complete, intestinal digestibility. Partial intestinal digestibility as used herein refers to intestinal digestibility fractions of over 20% or 25%, such as over 30%, 35%, 40%, or 45%, preferably as measured using the in vitro intestinal simulation method taught herein. Substantial intestinal digestibility as used herein refer to intestinal digestibility fraction of over 50%, such as over 55%, 60%, 65%, 70%, 75% or more, preferably as measured using the in vitro intestinal simulation method taught herein. Substantially complete intestinal digestibility as used herein refers to intestinal digestibility fractions of over 80%, 85%, 90%, such as over 95% or more, preferably as measured using the in vitro intestinal simulation method taught herein.

Non-limiting representative examples of controlled release agents suitable for use in the composition taught herein include fatty acids (e.g. saturated or unsaturated fatty acid, essential fatty acids, short-chain fatty acids, medium-chain fatty acids, long-chain fatty acids, very-long-chain fatty acids or mixture thereof), partly or fully hydrogenated (or hardened) animal oils (beef tallow, yellow grease, sheep tallow, hog fat and others or mixture thereof), partly or fully hydrogenated (or hardened) vegetable oils (e.g. palm oil, soybean oil, rapeseed oil, cottonseed oil, castor oil, and others or mixture thereof), waxes, soaps, and a mixture thereof.

Non-limiting examples of controlled release agents suitable for use in the composition as taught herein are described, for instance, in patents U.S. Pat. Nos. 3,541,204, 3,959,493, 5,496,571, JP60-168351, JP 61-195653, JP 63-317053, patent application WO 96/08168, and others.

Other non-limiting examples of controlled release agents suitable for use in the composition taught herein include controlled release agents that are sensitive to pH, i.e., that will break down depending on the pH environment. Ruminal bypass compositions belonging to this category are chosen because they are partially, substantially or substantially completely stable or insoluble in pH environment of the rumen (pH environment ranging between 5.5 and 7.0) and partially, substantially or completely soluble in pH environment of the abomasum (pH environment ranging from 2 to 4). Representative, non-limiting examples of pH-sensitive controlled release agents suitable for use in the compositions taught herein include liposomes, membranes, hydrogels, acrylic polymers or co polymers, a polysaccharides, vinyl polymers or copolymers, amino acids, and mixtures thereof. Examples of ruminal bypasses which are at least partially, preferably substantially or substantially completely sensitive to pH environment are described for instance in U.S. Pat. Nos. 4,713,245, 4,808412, 4,832,967, 4,876,097, and 5,227,166.

In an embodiment, the controlled release agent may be coated onto the gluconic acid and/or one more gluconic acid derivatives. In another embodiment, the gluconic acid and/or gluconic acid derivatives may be incorporated or encapsulated into a matrix composed of a controlled release agent as taught herein.

The controlled release agent suitable for allowing partial, substantial or substantially complete rumen-bypass may advantageously be selected from the group consisting of fatty acids, animal oils, vegetable oils and mixtures thereof.

Preferably, said controlled release agent comprises a vegetable oil, preferably selected from the group consisting of palm oil, soybean oil, rapeseed oil, cottonseed oil, and castor oil, or mixtures thereof. In a preferred embodiment, said controlled release agent comprises or consists of palm oil.

In an embodiment, the vegetable oil is at least partly hydrogenated, preferably fully hydrogenated.

The composition as taught herein may be made by any method known to a person skilled in the art. For example, the gluconic acid and/or one or more derivatives thereof may be presented in the form of a core and may be coated with a controlled release agent, or the gluconic acid and/or one or more derivatives thereof may be embedded in a matrix of a controlled release agent.

In an embodiment, the composition as taught herein is prepared by embedding the gluconic acid and/or one or more derivatives thereof in a matrix of a controlled release agent, e.g., a vegetable oil, e.g., an at least partially hydrogenated vegetable oil, e.g., a hydrogenated vegetable oil. The vegetable oil may be any vegetable oil, but is preferably selected from the group consisting of palm oil, soybean oil, rapeseed oil, cottonseed oil, and castor oil, or mixtures thereof. In a preferred embodiment, preferably said controlled release agent comprises or consists of palm oil.

Embedding a gluconic acid and/or one or more derivatives thereof in a matrix of a controlled release agent can be done by any technique suitable for making particles from a few microns to several millimetres known to a person skilled in the art. A non-limiting but highly suitable exemplary technique is spray chilling, also referred to as spray cooling, spray congealing, or prilling. Spray chilling is a lipid based system where the active ingredient (e.g., gluconic acid and/or one or more derivatives thereof) is mixed into a molten matrix (e.g., a molten matrix of the controlled release agent, such as hydrogenated vegetable oil), which mixture is subsequently fed through a nozzle, e.g., an atomizer nozzle, to produce droplets of the mixture. The droplets are allowed to solidify, e.g., by contacting them with cooled air at a temperature below the melting point of the controlled release agent resulting in the formation of particles. In an embodiment, the composition taught herein is obtainable by such method.

In an embodiment, the composition taught herein has an average particle size distribution of between about 150 and 3000 μm, such as between about 300 and 2000 μm, or between about 500 and 1500 μm, preferably between 650 and 1250 μm, more preferably between about 800 and 1000 μm. The particle size distribution can be measured by using standard sieve analysis (e.g., using a Retsch Sieve Shaker AS 200), e.g. as taught in ASTM C136. Reference herein to the average particle size is to the average particle diameter.

In an embodiment, the weight percent ratio of the gluconic acid and/or one or more derivatives thereof to the controlled release agent ranges from about 20:80 to about 65:35 percent by weight, or is at least about 40:60 percent by weight, preferably about 50:50 percent by weight of the composition taught herein.

The extent of rumen bypass of a given composition can be determined using an in vitro rumen simulation technique. An example of such an in vitro technique is in vitro incubation using rumen simulation fluid. An exemplary suitable rumen simulation fluid comprises or consists of 50 mM phosphate and 20 mM calcium chloride adjusted to pH 6.5 using NaOH. The in-vitro release of gluconic acid in a composition as taught herein can be determined as follows: 500 mg of the composition taught herein may be incubated in 150 mL rumen simulation fluid as taught herein in a shaking water bath at 39° C. for sixteen hours. A sample may be taken of the mixture, which may be centrifuged to collect supernatant for further analysis, e.g., using LC-MS. Optionally, the supernatant may be stored at −20° C. prior to analysis. In an embodiment, a composition as taught herein may be considered rumen-bypass when over 20%, such as over 25%, 30%, 35%, 40%, 45%, 50%, 55%, 60%, 65%, 70%, 75%, 80%, 85%, 90%, 95% or more, of the gluconic acid and/or one or more derivatives thereof is not released during the in vitro rumen simulation method as taught herein; i.e., over 20%, such as over 25%, 30%, 35%, 40%, 45%, 50%, 55%, 60%, 65%, 70%, 75%, 80%, 85%, 90%, 95% or more of the gluconic acid and/or one or more derivatives thereof remains present in the composition as taught herein, preferably as measured using the in vitro rumen simulation method taught herein.

In an embodiment, the composition as taught herein has a post-ruminal release of over 20%, such as over 25%, 30%, 35%, 40%, 45%, 50%, 55%, 60%, 65%, 70%, 75%, 80%, 85%, 90%, 95% or more of the gluconic acid and/or one or more derivatives, preferably as measured using an in vitro post-ruminal release simulation method as taught herein.

In vitro post-ruminal release may subsequently be simulated using an in vitro gastric phase, followed by an in vitro gut phase. To this end, the suspension remaining after the rumen simulation technique may be adjusted to pH 2 using 37% HCl, and pepsin (1 g/L), preferably from porcine gastric mucosa (e.g., Sigma P7000) is added. The mixture is preferably incubated for two more hours at 39° C. Then, the pH may be raised to 6.8 using NaOH, pancreatin and bile extract (both at 3 g/L), preferably pancreatin from porcine pancreas (e.g., Sigma P7545) and porcine bile extract (e.g., Sigma B8631), may be added, and the suspension is incubated for another five hours at 39° C. A sample may be taken of the mixture, which may be centrifuged to collect supernatant for further analysis, e.g., using LC-MS. Optionally, the supernatant may be stored at −20° C. prior to analysis.

In an embodiment, the composition as taught herein may be administered as a ruminant feed. In another embodiment, the composition as taught herein may be a constituent of a ruminant feed composition, or may be administered as a top-dress composition. The compositions as taught herein may be administered to a ruminant simultaneously with other conventional ruminant feeds and/or feed supplements (e.g. corn silage, alfalfa silage, mixed hay, and the like) or may be administered separately, i.e. before or after feeding a ruminant with conventional ruminant feeds.

In an embodiment, the composition taught herein may be administered in an amount between about 1 and 100 grams/day, preferably between about 5 and 60 grams/day, such as between 7 and 50 grams/day, between 10 and 45 grams/day, or between 12 and 40 grams/day, more preferably between about 12 and 20 grams a day. Amounts of gluconic acid and/or one or more derivatives thereof (like for example calcium gluconate) delivered post-ruminally may be between about 0.01 and 35 grams/day, preferably between about 0.1 and 20 grams/day, such as between 1 and 17 grams/day, between 2 and 15 grams/day, or between 3 and 12 grams/day, more preferably between 3 and 7 grams a day.

The ruminant may be selected from the group consisting of dairy cows, beef cattle, sheep, goats, bison, buffalo, moose, elks, giraffes, yaks, deer, camels, and antelope, and is preferably selected from dairy cows, sheep and goats. The ruminant referred to herein may be an adult ruminant.

The composition may be administered orally.

In an embodiment, the compositions as taught herein may be administered during the dry period of the lactating ruminant. In an embodiment, the compositions as taught herein may be administered during the lactation phase of the lactating ruminant. In yet another embodiment, the composition as taught herein may be administered during both the dry period and the lactation phase of the lactating ruminant.

The present invention is further illustrated, but not limited, by the following example. From the above discussion and the example, one skilled in the art can ascertain the essential characteristics of the present invention, and without departing from the teaching and scope thereof, can make various changes and modifications of the invention to adapt it to various usages and conditions. Thus, various modifications of the invention in addition to those shown and described herein will be apparent to those skilled in the art from the foregoing description. Such modifications are also intended to fall within the scope of the appended claims.

EXAMPLES

Example 1

Effects of Rumen Protected Calcium Gluconate on Lactation Performance in Dairy Cows Treatments Treatments were a negative control (no treatment) and 0.07% DMI (16 g/d of rumen-protected calcium gluconate containing 6.25 g of active ingredient). Based on potential rumen degradability of 20%, the proposed feeding amount was predicted to provide 5 g/d of active ingredient.

Materials and Methods

Fifty-three dairy cows were placed on treatment approximately 21 days prepartum until 308 days of lactation. During the dry period in late gestation, cows were fed a commercial dry cow ration to provide an estimated net energy for lactation ($NE_L$) 6.35 MJ/kg dry matter (DM) and 15.0% crude protein (CP) to meet 100% of energy and protein requirements, respectively. During the prepartum period, the dry cow ration was fed either as control (no supplementation) or treatment (containing 0.07% DM (16 g/day) rumen-protected calcium gluconate (RPCG)). After parturition, cows were fed a commercial lactating cow ration to provide an estimated $NE_L$ of 7.61 MJ/kg DM and 16.64% CP to meet 100% of energy and protein requirements, respectively. The lactating cow ration was fed as a control (no supplementation) or treatment (containing 0.07% DM RPCG [approximately 16 g/d of RPCG consisting of 9.75 g of controlled release agent (palm oil) and 6.25 g of calcium gluconate]). RPCG was prepared by using spray chilling technique. Using this lipid based system, calcium gluconate was added to a molten matrix of palm oil and the mixture was fed through an atomizer nozzle. The droplets solidified as they came into contact with cooled air at a temperature below the melting point of the lipid carrier resulting in RPCG particles.

Experimental Design

The experiment was a longitudinal study design consisting of one 21 day sampling period prepartum and a period of 308 days of lactation, which was split up in eleven sampling periods of 28 days postpartum. Samples were collected on the last day of each sampling period and milk was collected for the last three days of each sampling period. Dairy cows used on this experiment were kept in dry cow pens during the prepartum period and in tie stalls in the lactating dairy unit at the Trouw Nutrition Agresearch Dairy Research Facility in the postpartum period. Cows were fed a basal dry cow diet ad libitum during the prepartum period and a basal lactating cow diet ad libitum for the duration of the experiment as per current management practice.

Results

Animal Health and Performance

Body weight and body condition score were not different between treatments.

Milk and Component Production

Energy-corrected milk yield increased 2.71 kg/d in response to RPCG (Table 1), while milk fat yield increased 109 g/d and milk protein yield and lactose yield increased 100 g/d.

TABLE 1

Lactation performance of lactating dairy cows consuming rumen-protected calcium gluconate.

| Yield, kg/d | Control | RPCG |
|---|---|---|
| Milk | 37.5 | 39.2 |
| Fat | 1.61 | 1.72 |
| Protein | 1.19 | 1.29 |
| Lactose | 1.78 | 1.88 |
| Energy Corrected Yield, kg/d | 41.3 | 44.0 |

CONCLUSIONS

This experiment was designed to determine efficacy of rumen-protected calcium gluconate on milk production parameters in dairy cattle. These results demonstrate a positive response to dietary provision of 16 g/d of rumen-protected product in terms of both milk yield and milk component yield.

The invention claimed is:

1. A method for increasing milk yield in a lactating ruminant, the method comprising administering to the ruminant a composition comprising gluconic acid and/or one or more derivatives thereof and a controlled release agent, wherein the composition is administered to the ruminant in the 21 days prepartum.

2. The method according to claim 1, wherein the one or more derivatives of gluconic acid comprises gluconate salts and gluconate esters.

3. The method according to claim 2, wherein the one or more gluconic acid salts are selected from calcium gluconate, sodium gluconate, quinine gluconate, ferrous gluconate, potassium gluconate, zinc gluconate, copper gluconate, cobalt gluconate, barium gluconate, lithium gluconate, magnesium gluconate and cupric gluconate.

4. The method according to claim 1, wherein the controlled release agent is selected from the group consisting of fatty acids, animal oils, vegetable oils and mixtures thereof.

5. The method according to claim 4, wherein the controlled release agent is a vegetable oil.

6. The method according to claim 5, wherein the vegetable oil is selected from palm oil, soybean oil, rape seed oil, cottonseed oil, castor oil, and mixtures thereof.

7. The method according to claim 5, wherein the vegetable oil is palm oil.

8. The method according to claim 5, wherein the vegetable oil is partly hydrogenated or fully hydrogenated.

9. The method according to claim 1, wherein the weight percent ratio of the gluconic acid and/or one or more derivatives thereof to the controlled release agent ranges from about 20:80 to about 65:35 percent by weight.

10. The method according to claim 1, wherein the ruminant is selected from the group consisting of cows, cattle, sheep, goats, bison, buffalo, moose, elks, giraffes, yaks, deer, camels, and antelope.

11. The method according to claim 1, wherein the composition is administered orally.

12. The method according to claim 1, wherein the composition is administered during the dry period before lactation begins.

13. The method according to claim 12, wherein the composition is further administered during the lactation phase of the lactating ruminant.

14. The method according to claim 2, wherein the one or more gluconic acid salts is calcium gluconate and/or sodium gluconate.

15. The method according to claim 2, wherein the one or more gluconic acid is calcium gluconate.

16. The method according to claim 1, further comprising administering the composition to the ruminant in the 21 days postpartum.

17. The method according to claim 1, wherein the composition is administered to the ruminant with another ruminant feed or feed supplement.

18. The method according to claim 1, wherein 1 to 100 grams/day of the composition is administered to the ruminant.

19. The method according to claim 1, wherein 10 to 45 grams/day of the composition is administered to the ruminant.

20. The method according to claim 1, wherein the composition is administered daily in the 21 days prepartum.

* * * * *